US012790787B2

(12) United States Patent
Burnette et al.

(10) Patent No.: US 12,790,787 B2
(45) Date of Patent: Nov. 10, 2026

(54) FRAME FOR CONSTRUCTION MACHINE

(71) Applicant: Caterpillar Inc., Peoria, IL (US)

(72) Inventors: Matthew Graham Burnette, Decatur, IL (US); Vengadassalam Kalivarathan, Forsyth, IL (US); Nikhil Sharma, Forsyth, IL (US); Bruce Raymond Vahling, Urbana, IL (US)

(73) Assignee: Caterpillar Inc., Peoria, IL (US)

( * ) Notice: Subject to any disclaimer, the term of this patent is extended or adjusted under 35 U.S.C. 154(b) by 1193 days.

(21) Appl. No.: 17/654,453

(22) Filed: Mar. 11, 2022

(65) Prior Publication Data

US 2023/0304256 A1 Sep. 28, 2023

(51) Int. Cl.

| | |
|---|---|
| ***E02F 9/08*** | (2006.01) |
| ***B62D 21/18*** | (2006.01) |
| ***E02F 3/76*** | (2006.01) |
| ***E02F 3/80*** | (2006.01) |

(52) U.S. Cl.
CPC .......... *E02F 9/0808* (2013.01); *B62D 21/186* (2013.01); *E02F 3/7636* (2013.01); *E02F 3/80* (2013.01); *E02F 9/0841* (2013.01)

(58) Field of Classification Search
CPC ......... E02F 9/0808; E02F 9/0841; E02F 3/80; E02F 3/7636; B62D 21/186
See application file for complete search history.

(56) References Cited

U.S. PATENT DOCUMENTS

| | | | | | |
|---|---|---|---|---|---|
| 4,055,262 | A * | 10/1977 | Bauer et al. | B62D 49/00 | 296/190.07 |
| T966,007 | I4 * | 1/1978 | Liehr et al. | B62D 21/186 | 414/697 |
| 4,186,812 | A * | 2/1980 | Sutton | B62D 21/186 | 180/9.5 |
| 4,514,007 | A * | 4/1985 | Macht | E02F 9/10 | 180/311 |
| 5,568,841 | A * | 10/1996 | Weissbach | B62D 21/186 | 180/311 |
| 6,098,739 | A * | 8/2000 | Anderson et al. | B62D 21/186 | 180/312 |

(Continued)

FOREIGN PATENT DOCUMENTS

| | | |
|---|---|---|
| CN | 202324029 | 7/2012 |
| WO | 2019182582 | 9/2019 |

*Primary Examiner* — Christopher J Sebesta
*Assistant Examiner* — Joel F. Mitchell

(57) ABSTRACT

A frame for a construction machine includes a pair of side truss members extending along a longitudinal axis of the construction machine. Each side truss member defines one or more first cut-outs, an axle opening for receiving a portion of an axle assembly of the construction machine, and a first through-aperture. The first through-aperture is adapted to at least partially receive a fastening element for coupling the axle assembly with a corresponding side truss member. The frame also includes a first lateral truss member extending between the pair of side truss members and defining at least one second cut-out. The frame further includes a second lateral truss member extending between the pair of side truss members and defining at least one third cut-out. The pair of side truss members, the first lateral truss member, and the second lateral truss member together define a hollow space of the frame.

20 Claims, 9 Drawing Sheets

(56) References Cited

U.S. PATENT DOCUMENTS

| | | | | |
|---|---|---|---|---|
| 7,156,200 | B2 * | 1/2007 | Dershem et al. ...... | B62D 55/10 180/311 |
| 7,681,919 | B2 * | 3/2010 | Springer ................ | B62D 53/02 172/776 |
| 7,832,519 | B2 * | 11/2010 | Sakamoto et al. ... | B62D 21/186 280/798 |
| 7,841,423 | B2 | 11/2010 | Damm et al. | |
| 8,393,429 | B2 | 3/2013 | Thomson et al. | |
| 9,068,304 | B2 | 6/2015 | Mannebach et al. | |
| 9,267,268 | B2 | 2/2016 | Arai et al. | |
| 9,840,283 | B2 * | 12/2017 | Ducheneaux et al. ........................ | B62D 21/186 |
| 10,590,625 | B2 | 3/2020 | Burnette et al. | |
| 11,607,910 | B1 * | 3/2023 | Vavilala et al. ...... | E02F 9/0841 |
| 2022/0098822 | A1 * | 3/2022 | Kumbhar et al. .... | E02F 3/7672 |

* cited by examiner

FRAME FOR CONSTRUCTION MACHINE

TECHNICAL FIELD

The present disclosure relates to a construction machine, and more particularly, to a frame for the construction machine.

BACKGROUND

A construction machine, such as a motor grader, may be used in road construction and maintenance for displacing, distributing, and leveling material, such as, soil, gravel, snow, and the like. The construction machine includes a frame assembly that may support various components of the construction machine including, but not limited to, a power source, an operator cab, wheels, and the like. The frame assembly may include a front frame and a rear frame pivotally coupled to each other.

Conventionally, the rear frame may include a number of heavy rails coupled to each other to form a structure of the rear frame. Further, the rear frame of the construction machine may include a mounting structure for coupling a work implement, such as, a ripper assembly therewith. The mounting structure may include a pair of brackets that may be coupled with the rails of the conventional rear frame.

The rear frame may also include a pair of elongated tag links extending forwardly from the mounting structure. The tag links may allow coupling of a rear axle of the construction machine with the rear frame. The tag links and the mounting structure are embodied as separate components that may be coupled with the rails of the rear frame using joining processes, such as, welding. The tag links and the mounting structure increase part numbers associated with the rear frame. Further, the tag links and the mounting structure may be heavy, and may increase an overall cost and weight associated with the rear frame.

U.S. Pat. No. 9,267,268 describes a motor grader includes a fuel tank, a vehicle body frame, a left-side mount part, a right-side mount part, a rear-side mount part and a reducing agent tank. The left-side mount part and the right-side mount part are respectively disposed on a left lateral frame and a right lateral frame while being disposed on both sides of the fuel tank in a vehicle width direction, and fix the fuel tank to the vehicle body frame. The rear-side mount part is disposed on the left lateral frame in the vehicle width direction while being disposed rearward of the fuel tank and fixes the fuel tank to the vehicle body frame. The reducing agent tank is disposed rearward of and adjacently to the fuel tank while being disposed on the right lateral frame side and accumulates a reducing agent for processing an exhaust gas from an engine.

SUMMARY OF THE DISCLOSURE

In an aspect of the present disclosure, a frame for a construction machine is provided. The frame includes a pair of side truss members extending along a longitudinal axis of the construction machine. Each side truss member defines a number of first cut-outs. Each side truss member also defines an axle opening for receiving a portion of an axle assembly of the construction machine. Each side truss member further defines a first through-aperture adapted to at least partially receive a fastening element for coupling the axle assembly with a corresponding side truss member. The frame also includes a first lateral truss member extending between the pair of side truss members proximate to a first end of the frame. The first lateral truss member defines at least one second cut-out. The frame further includes a second lateral truss member extending between the pair of side truss members proximate to a second end of the frame. The second lateral truss member defines at least one third cut-out. The pair of side truss members, the first lateral truss member, and the second lateral truss member together define a hollow space of the frame.

In another aspect of the present disclosure, a construction machine is provided. The construction machine includes a work implement. The construction machine also includes an axle assembly. The construction machine further includes a frame supporting the work implement and the axle assembly. The frame includes a pair of side truss members extending along a longitudinal axis of the construction machine. Each side truss member defines a number of first cut-outs. Each side truss member also defines an axle opening for receiving a portion of the axle assembly of the construction machine. Each side truss member further defines a first through-aperture adapted to at least partially receive a fastening element for coupling the axle assembly with a corresponding side truss member. The frame also includes a first lateral truss member extending between the pair of side truss members proximate to a first end of the frame. The first lateral truss member defines at least one second cut-out. The frame further includes a second lateral truss member extending between the pair of side truss members proximate to a second end of the frame. The second lateral truss member defines at least one third cut-out. The pair of side truss members, the first lateral truss member, and the second lateral truss member together define a hollow space of the frame.

In yet another aspect of the present disclosure, a frame assembly for a construction machine is provided. The frame assembly includes a frame. The frame includes a pair of side truss members extending along a longitudinal axis of the construction machine. Each side truss member defines a number of first cut-outs. Each side truss member also defines an axle opening for receiving a portion of an axle assembly of the construction machine. Each side truss member further defines a first through-aperture adapted to at least partially receive a fastening element for coupling the axle assembly with a corresponding side truss member. The frame also includes a first lateral truss member extending orthogonally relative to the longitudinal axis. The first lateral truss member extends between the pair of side truss members proximate to a first end of the frame. The first lateral truss member defines at least one second cut-out. The frame further includes a second lateral truss member extending between the pair of side truss members proximate to a second end of the frame. The second lateral truss member defines at least one third cut-out. The pair of side truss members, the first lateral truss member, and the second lateral truss member together define a hollow space of the frame. The frame assembly also includes at least one panel coupled with a corresponding side truss member from the pair of side truss members.

Other features and aspects of this disclosure will be apparent from the following description and the accompanying drawings.

DETAILED DESCRIPTION

Figure 1:
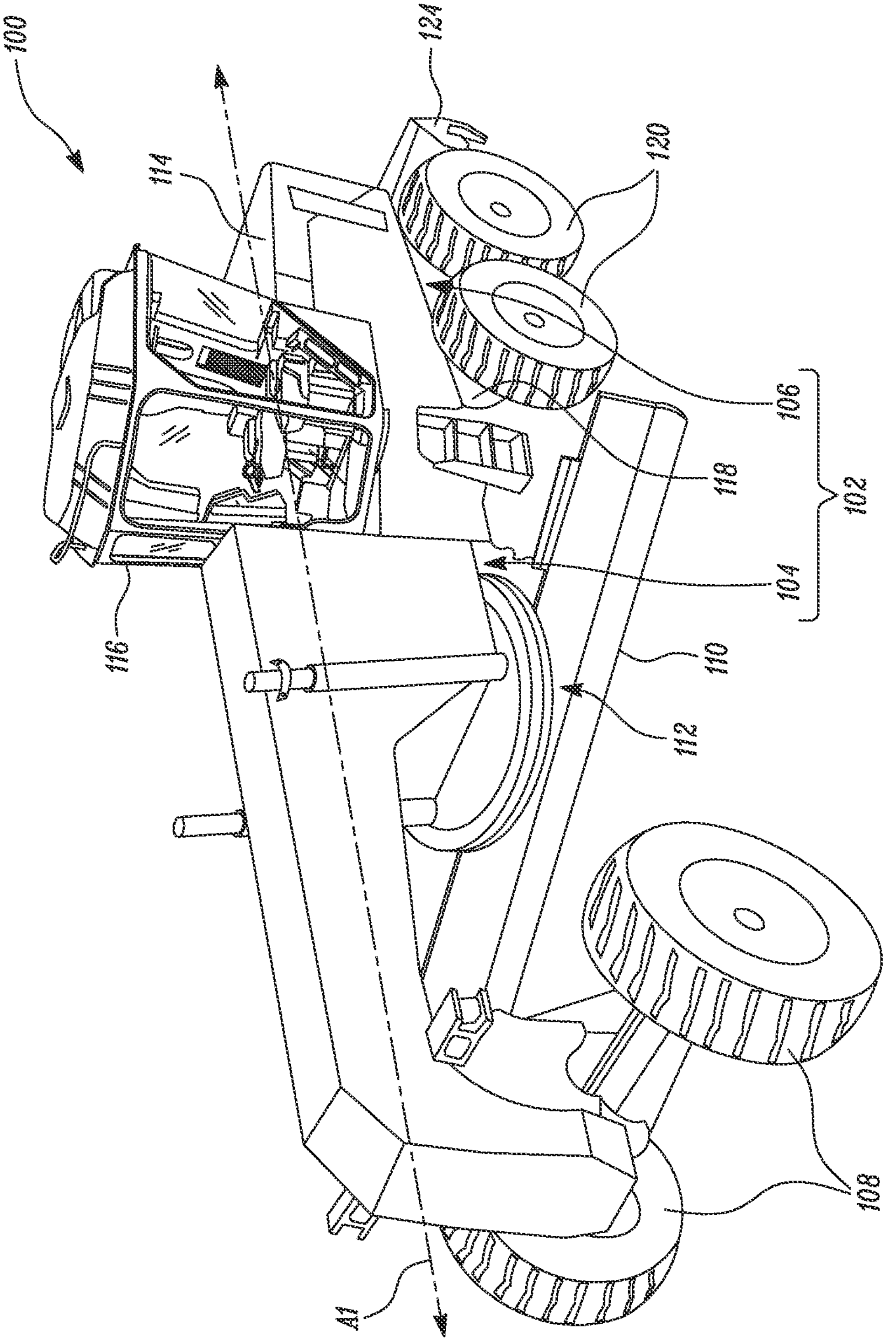
FIG. 1 is a perspective view of a construction machine, according to an embodiment of the present disclosure.

Wherever possible, the same reference numbers will be used throughout the drawings to refer to the same or like parts. Referring to FIG. 1, a perspective view of an exemplary construction machine 100 is illustrated. As shown, the construction machine 100 is a motor grader. Although the motor grader is depicted, the present disclosure is not limited to a type of the construction machine 100. It may be understood that the construction machine 100 may alternatively include loaders, excavators, tractors, trucks, and the like. The construction machine 100 may be used to flatten uneven ground surfaces such as during a grading process prior to road construction and/or moving of snow, debris, and so on.

The construction machine 100 defines a longitudinal axis A1. The construction machine 100 includes a frame assembly 102. The frame assembly 102 includes a front frame 104. Further, the frame assembly 102 also includes a rear frame 106 of the construction machine 100. The rear frame 106 may be hereinafter interchangeably referred to as the frame 106. The rear frame 106 is movably coupled to the front frame 104. The front frame 104 supports a pair of front wheels 108. The front frame 104 also supports a work implement 110. The work implement 110 may be used to perform work operations, such as, grading or snow removal. More particularly, the work implement 110 is supported by a Drawbar-Circle-Moldboard (DCM) system 112.

Further, the construction machine 100 includes an axle assembly 118. The construction machine 100 also includes two pairs of rear wheels 120. The rear wheels 120 and the front wheels 108 allow movement of the construction machine 100 on ground surfaces. The pairs of rear wheels 120 couple with the axle assembly 118. The construction machine 100 further includes a work implement 124. The frame 106 supports the work implement 124 and the axle assembly 118. The work implement 124 includes a ripper herein that may be used to loosen hardened ground, break up rock formations, and otherwise engage a ground surface.

Further, the rear frame 106 also supports various components of the construction machine 100 thereon, such as, a power source (not shown) disposed within an enclosure 114, an operator cabin 116, the axle assembly 118, etc. The power source may be an engine, such as an internal combustion engine, any electric source of power, and the like. The engine may include a gasoline engine, a diesel engine, a natural gas engine, and the like. The engine may supply output power to various components of the construction machine 100 for operation thereof.

Further, the construction machine 100 includes the operator cabin 116. An operator of the construction machine 100 may sit or stand in the operator cabin 116 for performing one or more vehicle operations. The operator cabin 116 may include a user interface (not shown). The user interface may include input and output devices for controlling one or more vehicle components.

Figure 2:
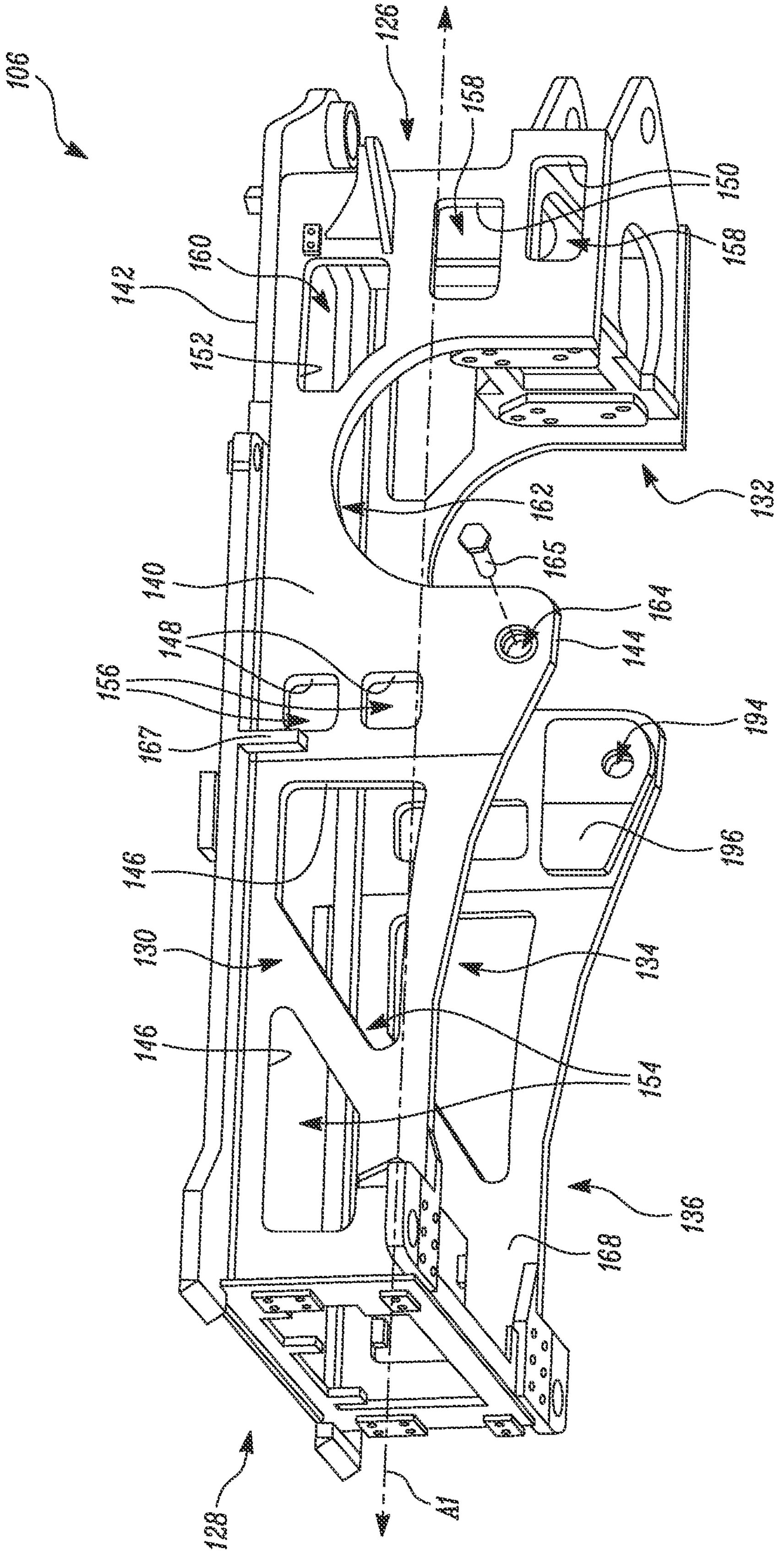
FIG. 2 is a side perspective view illustrating a rear frame associated with the construction machine of FIG. 1 and a first side truss member of the rear frame, according to an embodiment of the present disclosure.

Referring to FIG. 2, a side perspective view of the rear frame 106 is illustrated, in accordance with an embodiment of the present disclosure. The frame 106 has a first end 126 and a second end 128 opposite the first end 126. Further, the frame 106 defines a first side 130 and a second side 132 opposite the first side 130. The frame 106 includes a pair of side truss members 134, 136 extending along the longitudinal axis A1 of the construction machine 100 (see FIG. 1). The pair of side truss members 134, 136 includes a first side truss member 134 and a second side truss member 136. The side truss member 134 may be interchangeably referred to as the first side truss member 134. Further, the side truss member 136 may be interchangeably referred to as the second side truss member 136. Moreover, the first side truss member 134 and the second side truss member 136 may be identical to each other in terms of design and dimensions.

The first side truss member 134 is disposed at the first side 130 of the frame 106. The first side truss member 134 defines an inner surface 138 (shown clearly in FIG. 3). The first side truss member 134 also defines an outer surface 140. The inner and outer surfaces 138, 140 are disposed opposite to each other. The first side truss member 134 has a top surface 142 and a bottom surface 144.

The first side truss member 134 also defines a number of first cut-outs 154, 156, 158, 160. The first side truss member 134 further defines a cut-out surface 146, 148, 150, 152 extending between the inner surface 138 and the outer surface 140. The cut-out surface 146, 148, 150, 152 is defined by one or more of the first cut-outs 154, 156, 158, 160.

Further, the first cut-outs 154 are disposed proximate to the second end 128 of the frame 106. In the illustrated example of FIG. 2, the first cut-outs 154 have a trapezoidal shape. The cut-out surfaces 146 are defined by the first cut-outs 154. Further, the first cut-outs 156 are defined adjacent to the first cut-outs 154. In the illustrated example of FIG. 2, the first cut-outs 156 have a square shape. The cut-out surfaces 148 are defined by the first cut-outs 156. Further, the first cut-outs 158 are disposed proximate to the first end 126 of the frame 106. In the illustrated example of FIG. 2, the first cut-outs 158 have a rectangular shape. The cut-out surfaces 150 are defined by the first cut-outs 158. Moreover, the first cut-out 160 is disposed proximate to the first end 126 of the frame 106 and vertically above the first cut-outs 158. In the illustrated example of FIG. 2, the first cut-out 160 includes a substantially rectangular shape having a curved side. The curved side of the first cut-out 160 may be provided to accommodate an axle opening 162 in the frame 106. Further, the cut-out surface 152 is defined by the first cut-out 160.

It should be noted that the present disclosure is not limited by a total number of the first cut-outs 154, 156, 158, 160. Accordingly, the first side truss member 134 may include more than seven first cut-outs 154, 156, 158, 160 or less than seven first cut-outs 154, 156, 158, 160. Further, the present disclosure is not limited by a shape and a size of the first cut-outs 154, 156, 158, 160. Accordingly, the first cut-outs 154, 156, 158, 160 may include any shape and size.

The first side truss member 134 further defines the axle opening 162 for receiving a portion of the axle assembly 118 (see FIG. 1) of the construction machine 100. The axle opening 162 is disposed proximate to the first end 126 of the frame 106. The first side truss member 134 also defines a first through-aperture 164 that at least partially receives a fastening element 165 for coupling the axle assembly 118 with the corresponding side truss member 134.

The frame 106 also includes a stiffening plate 166 (shown clearly in FIG. 5) coupled to the inner surface 138 of the first side truss member 134. The stiffening plate 166 and the corresponding side truss member 134 together define the first through-aperture 164. Further, the first side truss member 134 may include a tandem stop 167. The first side truss member 134 may also include various plates, projections, brackets, and the like, that may allow coupling of various machine components with the first side truss member 134, without any limitations.

Figure 3:
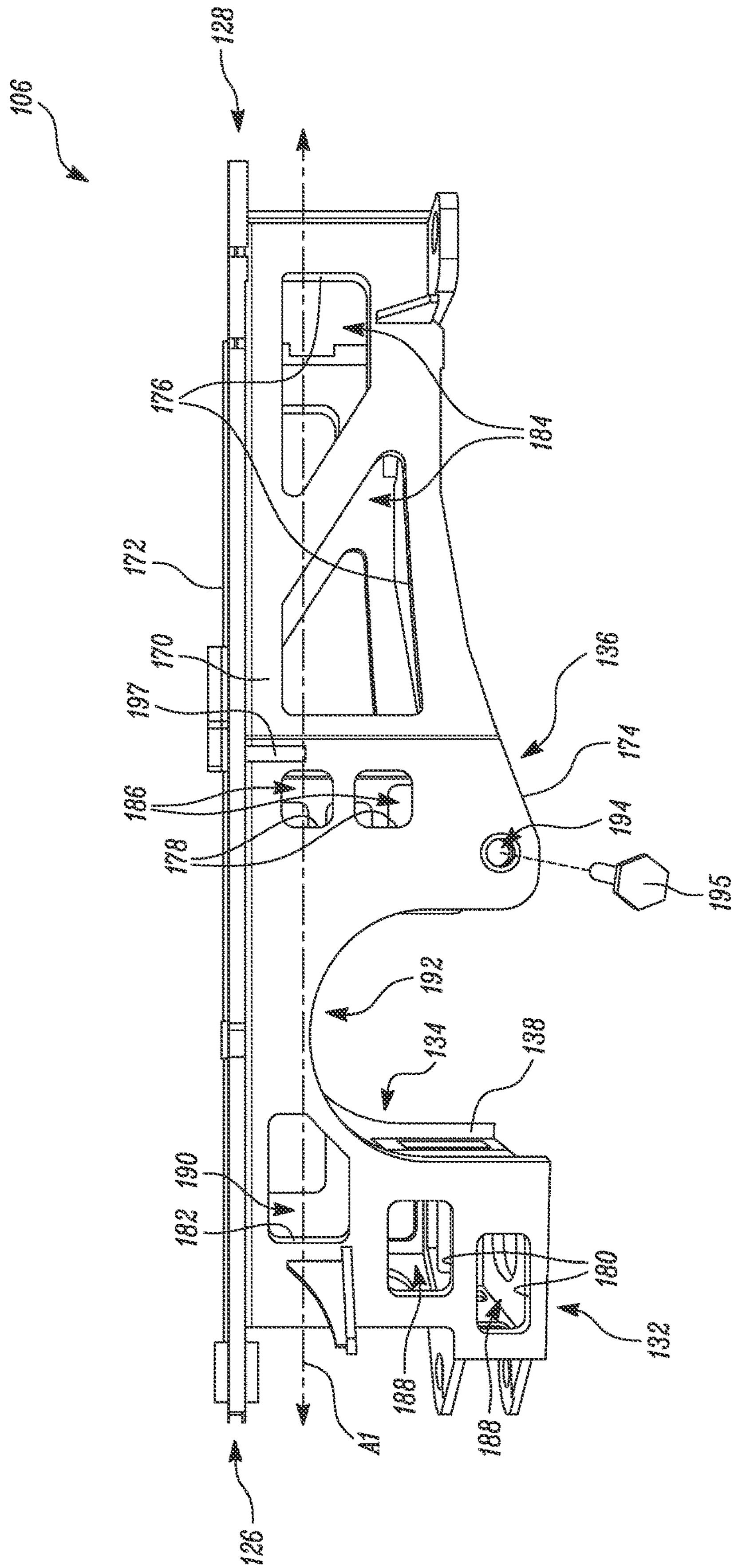
FIG. 3 is a side perspective view illustrating a second side truss member of the rear frame of FIG. 2.

Referring to FIG. 3 a side perspective view illustrating the second side 132 of the rear frame 106 is illustrated. The second side truss member 136 is disposed at the second side 132 of the frame 106. The second side truss member 136 is spaced apart from the first side truss member 134. The second side truss member 136 defines an inner surface 168 (shown clearly in FIG. 2). The second side truss member 136 also defines an outer surface 170. The inner and outer surfaces 168, 170 are disposed opposite to each other. The second side truss member 136 has a top surface 172 and a bottom surface 174.

The second side truss member 136 also defines a number of first cut-outs 184, 186, 188, 190. The second side truss member 136 further defines a cut-out surface 176, 178, 180, 182 extending between the inner surface 168 and the outer surface 170. The cut-out surface 176, 178, 180, 182 is defined by one or more of the first cut-outs 184, 186, 188, 190.

Further, the first cut-outs 184 are disposed proximate to the second end 128 of the frame 106. In the illustrated example of FIG. 3, the first cut-outs 184 have a trapezoidal shape. The cut-out surfaces 176 are defined by the first cut-outs 184. Furthermore, the first cut-outs 186 are defined adjacent to the first cut-outs 184. In the illustrated example of FIG. 3, the first cut-outs 186 have a square shape. The cut-out surfaces 178 are defined by the first cut-outs 186. Moreover, the first cut-outs 188 are disposed proximate to the first end 126 of the frame 106. In the illustrated example of FIG. 3, the first cut-outs 188 have a rectangular shape. The cut-out surfaces 180 are defined by the first cut-outs 188. Moreover, the first cut-out 190 is disposed proximate to the first end 126 of the frame 106 and vertically above the first cut-outs 188. In the illustrated example of FIG. 3, the first cut-out 190 includes a substantially rectangular shape having a curved side. The curved side of the first cut-out 190 may be provided to accommodate an axle opening 192. Further, the cut-out surface 182 is defined by the first cut-out 190.

It should be noted that the present disclosure is not limited by a total number of the first cut-outs 184, 186, 188, 190. Accordingly, the second side truss member 136 may include more than seven first cut-outs 184, 186, 188, 190 or less than seven first cut-outs 184, 186, 188, 190. Further, the present disclosure is not limited by a shape and a size of the first cut-outs 184, 186, 188, 190. Accordingly, the first cut-outs 184, 186, 188, 190 may include any shape and size.

The second side truss member 136 further defines the axle opening 192 for receiving a portion of the axle assembly 118 (see FIG. 1) of the construction machine 100 (see FIG. 1). The axle opening 192 is disposed proximate to the second end 128 of the frame 106. The second side truss member 136 also defines a first through-aperture 194 that at least partially receives a fastening element 195 for coupling the axle assembly 118 with the corresponding side truss member 136.

The frame 106 further includes a stiffening plate 196 (shown clearly in FIG. 2) coupled to the inner surface 168 of the second side truss member 136. The stiffening plate 166 (see FIG. 5) of the first side truss member 134 (see FIG. 2) and the stiffening plate 196 of the second side truss member 136 may have a similar shape and dimensions.

The stiffening plate 196 and the corresponding side truss member 136 together define the first through-aperture 194. Further, the second side truss member 136 may include a tandem stop 197. The second side truss member 136 may also include various plates, projections, brackets, and the like, that may allow coupling of various machine components with the second side truss member 136, without any limitations.

Figure 4:
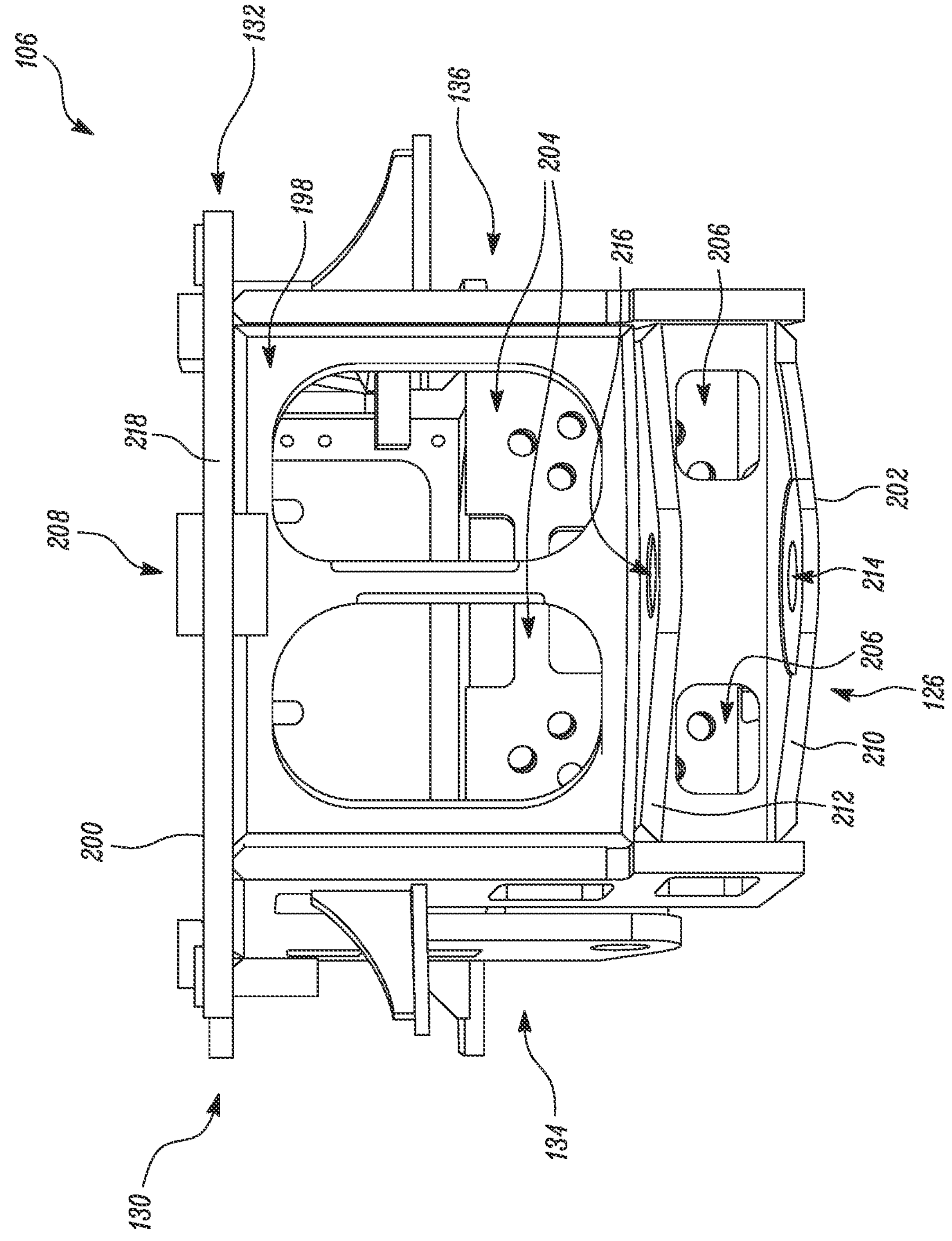
FIG. 4 is a front perspective view illustrating a first lateral truss member of the rear frame of FIG. 2.

Referring now to FIG. 4, a front perspective view of the rear frame 106 is illustrated. The frame 106 includes a first lateral truss member 198 extending between the pair of side truss members 134, 136 proximate to the first end 126 of the frame 106. The first lateral truss member 198 may be substantially orthogonal to the longitudinal axis A1. The first lateral truss member 198 connects the first side truss member 134 with the second side truss member 136 proximate to the first end 126 of the frame 106.

The first lateral truss member 198 has a top surface 200 and a bottom surface 202. The first lateral truss member 198 defines one or more second cut-outs 204, 206. Specifically, the first lateral truss member 198 includes two second cut-outs 204. The second cut-outs 204 are defined adjacent to each other. The second cut-outs 204 are defined proximate to the top surface 200 of the first lateral truss member 198. The second cut-outs 204 are rectangular in shape and include rounded corners. Moreover, the first lateral truss member 198 includes two second cut-outs 206. The second cut-outs 206 are defined proximate to the bottom surface 202 of the first lateral truss member 198. The second cut-outs 206 are rectangular in shape and include rounded corners. The dimensions of the second cut-outs 206 may be lesser than the dimensions of the second cut-outs 204.

It should be noted that the present disclosure is not limited by a total number of the second cut-outs 204, 206. Accordingly, the first lateral truss member 198 may include more than four second cut-outs 204, 206 or less than four second cut-outs 204, 206, without any limitations. Further, the present disclosure is not limited by a shape and a size of the second cut-outs 204, 206. Accordingly, the second cut-outs 204, 206 may include any shape and size.

The first lateral truss member 198 includes a hitch mount 208 for coupling the rear frame 106 with the front frame 104 (see FIG. 1). The hitch mount 208 may allow pivotal coupling of the rear frame 106 with the front frame 104. The hitch mount 208 includes a first plate 210 and a second plate 212 that is vertically spaced apart from the first plate 210. The first plate 210 is disposed proximate to the bottom surface 202 of the first lateral truss member 198. The first plate 210 defines a first through-hole 214. The second plate 212 defines a second through-hole 216 in alignment with the first through-hole 214. In some examples, the first plate 210 and the second plate 212 may be triangular in shape. Further, the first and second plates 210, 212 may be similar to each other in terms of design and dimensions. In other examples, the first plate 210 and the second plate 212 may have different design and dimensions.

The hitch mount 208 also includes a third plate 218 disposed proximate to the top surface 200 of the first lateral truss member 198. The third plate 218 defines a through opening 222 (shown clearly in FIG. 6). Further, the first through-hole 214 and the second through-hole 216 may align with the through opening 222 of the third plate 218 for receiving a fastener (not shown), for example, a pin or a bolt for pivotally coupling the frame 106 with the front frame 104. It should be noted that the hitch mount 208 may include any other combination of components that may allow coupling of the front frame 104 with the rear frame 106, without any limitations.

Figure 5:
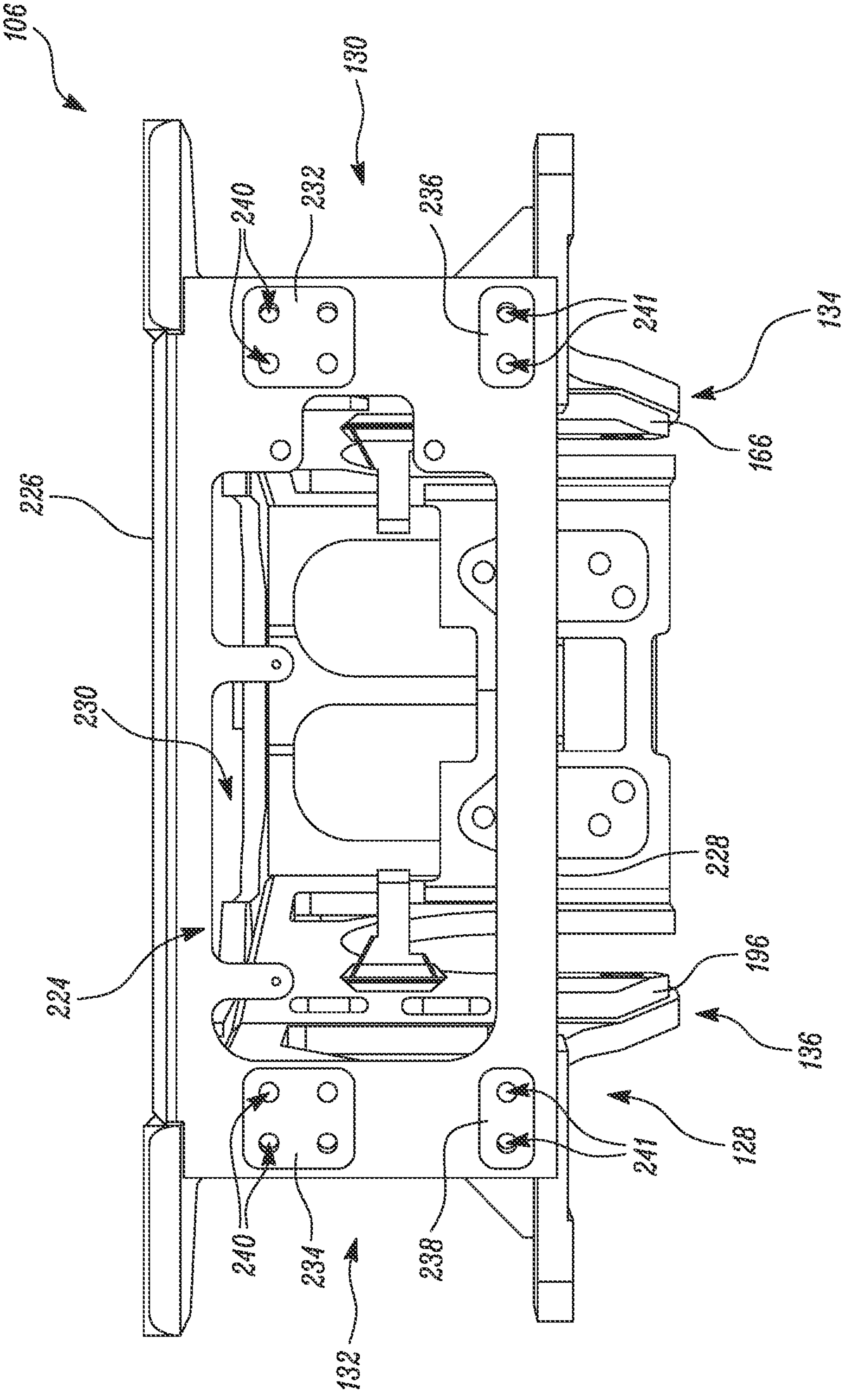
FIG. 5 is a rear perspective view illustrating a second lateral truss member of the rear frame of FIG. 2.

FIG. 5 illustrates a rear perspective view of the rear frame 106 is illustrated. As illustrated in FIG. 5, the frame 106 includes a second lateral truss member 224 extending between the pair of side truss members 134, 136 proximate to the second end 128 of the frame 106. The second lateral truss member 224 may be substantially orthogonal to the longitudinal axis A1. The second lateral truss member 224 connects the first side truss member 134 with the second side truss member 136 proximate to the second end 128 of the frame 106. The second lateral truss member 224 has a top surface 226 and a bottom surface 228. The second lateral truss member 224 defines one or more third cut-outs 230. In the illustrated example of FIG. 5, the second lateral truss member 224 defines the single third cut-out 230. The third cut-out 230 is substantially rectangular and includes a number of slots. In other examples, the second lateral truss member 224 may include more than one third cut-out 230. For example, the second lateral truss member 224 may include two third cut-outs, without any limitations. Further, the present disclosure is not limited by a shape and a size of the third cut-out 230. Accordingly, the third cut-out 230 may include any shape and size.

Further, the second lateral truss member 224 includes one or more mounting plates 232, 234, 236, 238 for coupling the work implement 124 (see FIG. 1) of the construction machine 100 (see FIG. 1) with the frame 106. In some examples, the second lateral truss member 224 may include four mounting plates 232, 234, 236, 238. The mounting plate 232 is disposed proximate to the top surface 226 of the second lateral truss member 224. Further, the mounting plate 232 is disposed proximate to the first side 130 of the frame 106. The mounting plate 234 is disposed proximate to the top surface 226 of the second lateral truss member 224. Moreover, the mounting plate 234 is disposed proximate to the second side 132 of the frame 106. In some examples, the mounting plates 232, 234 may have a square shape. Each mounting plate 232, 234 includes a number of through-holes 240 for receiving a fastening means (not shown), for example, a pin, a screw, or a bolt. The fastening means may couple the work implement 124 with the frame 106. In the illustrated example of FIG. 5, each mounting plate 232, 234 includes four through-holes 240.

Further, the mounting plate 236 is disposed proximate to the bottom surface 228 of the second lateral truss member 224. Furthermore, the mounting plate 236 is disposed proximate to the first side 130 of the frame 106. The mounting plate 238 is disposed proximate to the bottom surface 228 of the second lateral truss member 224. The mounting plate 238 is disposed proximate to the second side 132 of the frame 106. In some examples, the mounting plates 236, 238 may be rectangular in shape.

Each mounting plate 236, 238 includes a number of through-holes 241 for receiving a fastening means (not shown), for example, a pin, a screw, or a bolt. The fastening means may couple the work implement 124 with the frame 106. In the illustrated example of FIG. 5, each mounting plate 236, 238 includes two through-holes 241.

Figure 6:
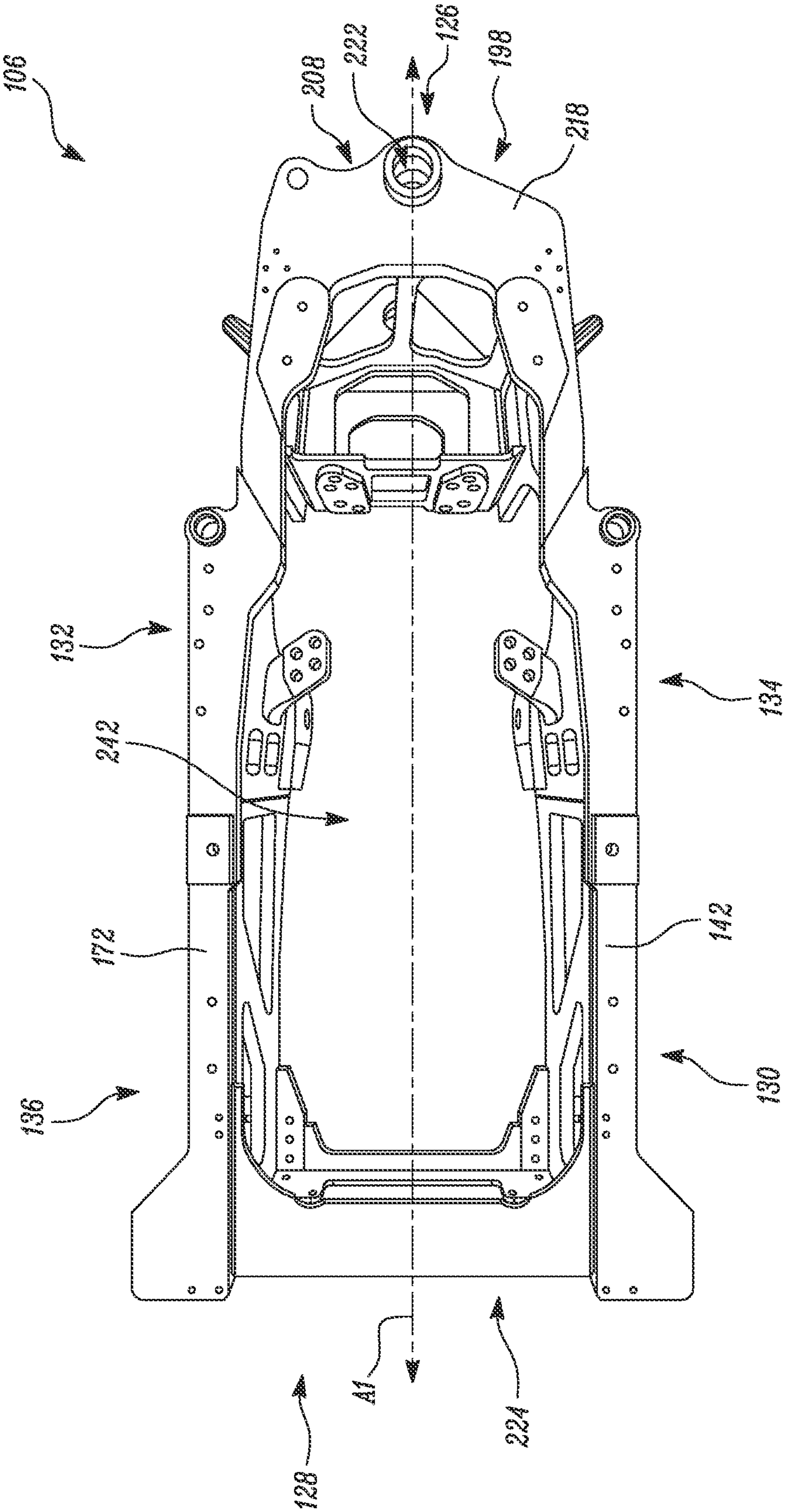
FIG. 6 is a top perspective view of the rear frame of FIG. 2.
Figure 7:
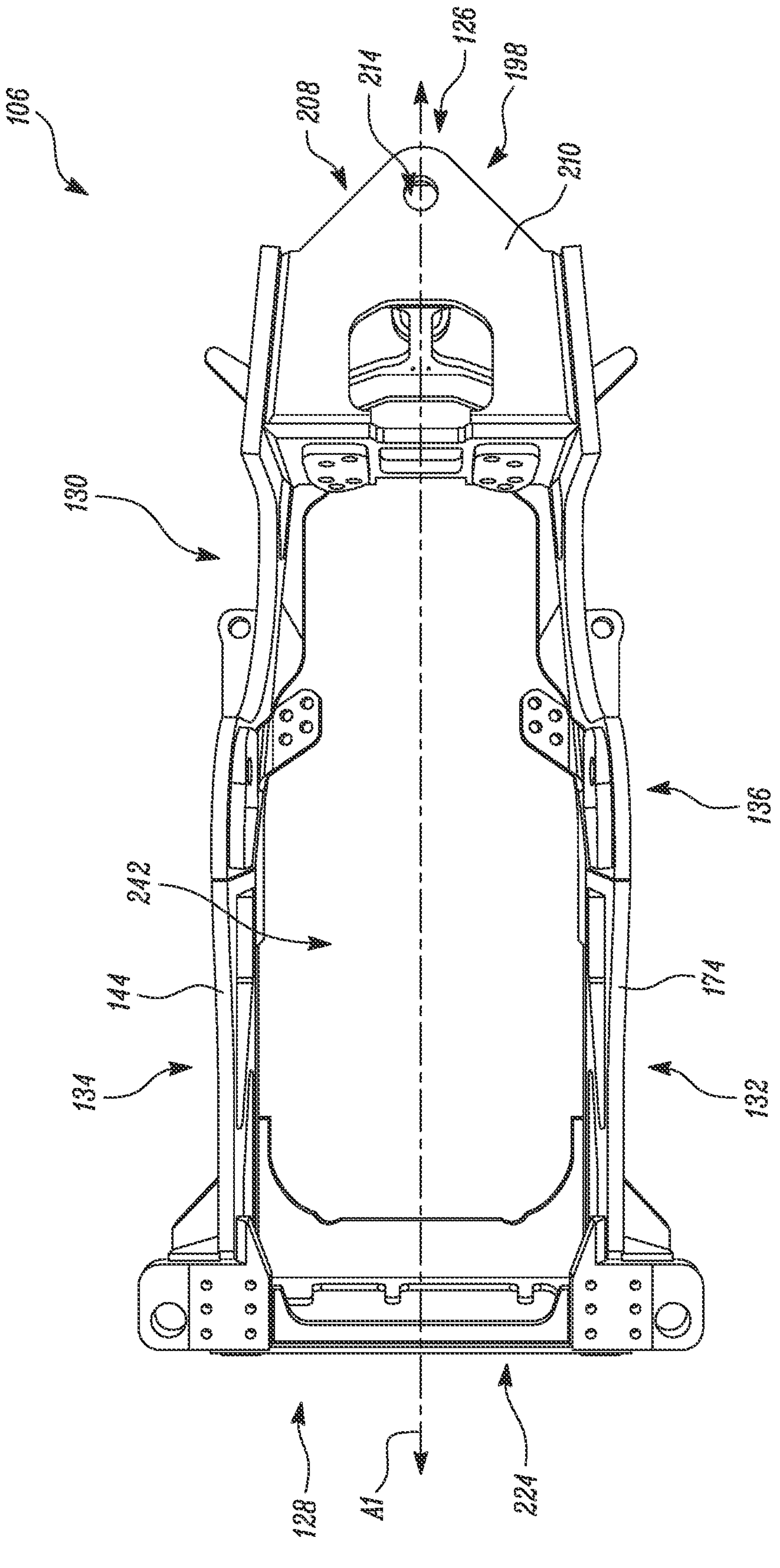
FIG. 7 is a bottom perspective view of the rear frame of FIG. 2.

FIGS. 6 and 7 illustrates a top perspective view and a bottom perspective view, respectively, of the rear frame 106. As illustrated in FIGS. 6 and 7, the pair of side truss members 134, 136, the first lateral truss member 198 and the second lateral truss member 224 together define a hollow space 242 of the frame 106. The hollow space 242 may receive one or more components or systems associated with the construction machine 100 (see FIG. 1), for example, a transmission system. The pair of side truss members 134, 136 may be coupled to the first lateral truss member 198 through a heat treatment process, such as welding, without any limitations. Further, the pair of side truss members 134, 136 may be coupled to the second lateral truss member 224 through a heat treatment process, such as welding, without any limitations.

Figure 8:
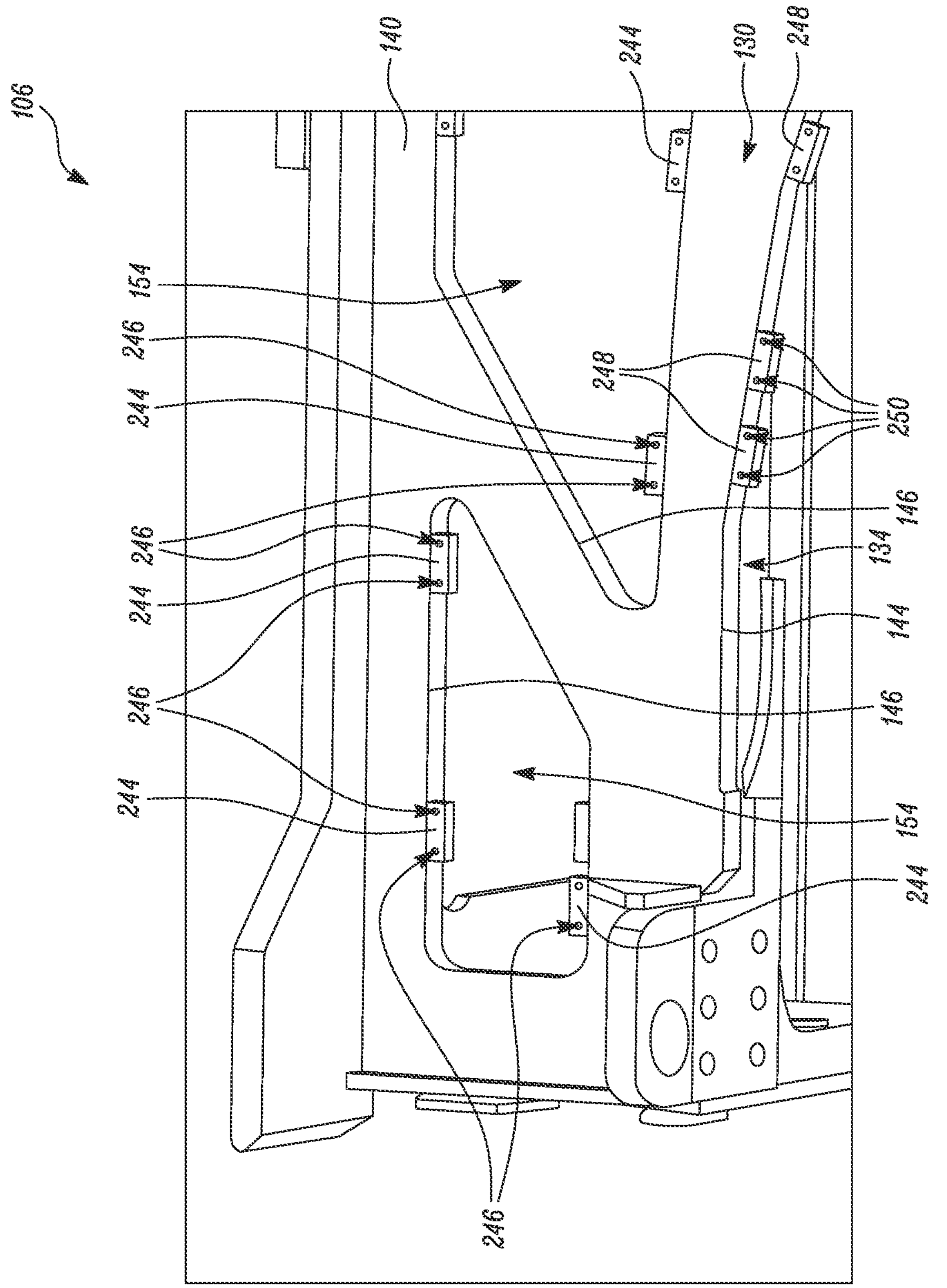
FIG. 8 is a perspective view illustrating a portion of the first side truss member and a number of mounting brackets coupled with the first side truss member, according to an embodiment of the present disclosure.

Referring to FIG. 8, a perspective view of the rear frame 106 is illustrated. The frame 106 includes one or more mounting blocks 244, 248 coupled to each side truss member 134, 136. For illustrative purposes, the mounting blocks 244, 248 coupled to the first side truss member 134 will now be explained in relation to FIG. 8. However, the details provided below are equally applicable to a coupling of the mounting blocks 244,248 with the second side truss member 136.

The one or more mounting blocks 244 extend from and are coupled to the cut-out surface 146. Although not shown herein, it should be noted that the mounting blocks 244 may also be coupled to the cut-out surfaces 148, 150, 152 (see FIG. 2). Further, each mounting block 244 includes two through-apertures 246. It should be noted that the first side truss member 134 may include any number of mounting blocks 244, based on application requirements.

Further, the mounting blocks 248 extend from and are coupled to the bottom surface 144 of the first side truss member 134. Each mounting block 248 includes two through-apertures 250. It should be noted that the first side truss member 134 may include any number of mounting blocks 248, based on application requirements. In other examples, the mounting blocks 248 may be coupled to the outer surface 140, the inner surface 138 (see FIG. 3), or the top surface 142 (see FIG. 2) of the first side truss member 134, without any limitations.

Figure 9:
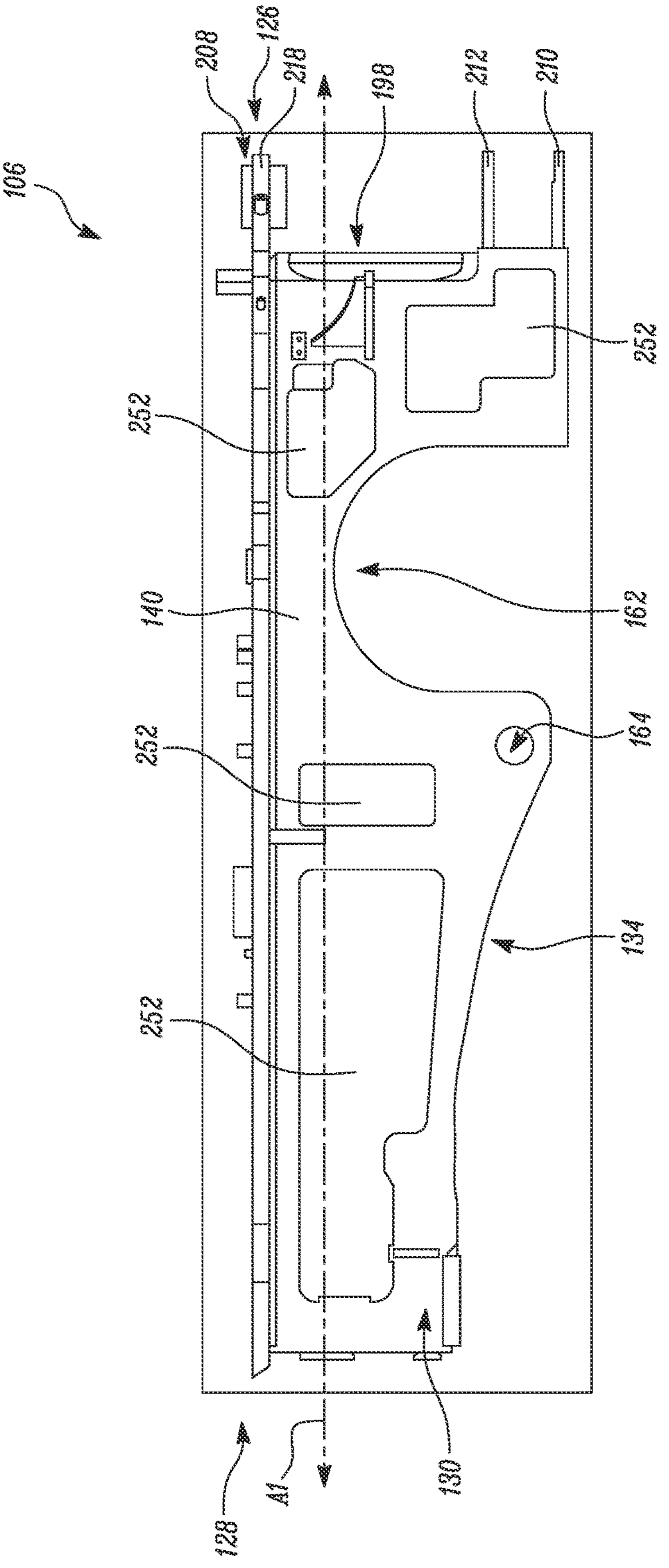
FIG. 9 is a perspective view illustrating the first side truss member and a number of panels coupled with the first side truss member, according to an embodiment of the present disclosure.

Referring to FIG. 9, the frame assembly 102 includes one or more panels 252 coupled with a corresponding side truss member 134, 136 from the pair of side truss members 134, 136. The one or more panels 252 may be a sound suppression panel. In an example, the panels 252 may suppress a sound generated during an operation of the power source of the construction machine 100 (see FIG. 1). Alternatively, the panels 252 may serve any other purpose. In some examples, the panels 252 may enclose or protect components that are disposed inside the frame 106. In the illustrated example of FIG. 9, the panels 252 are coupled to the first side truss member 134. However, it should be noted that the details provided below are equally applicable to a coupling of the panels 252 with the second side truss member 136.

Further, the number of mounting blocks 244 (see FIG. 8) couple the one or more panels 252 of the construction machine 100 with the corresponding side truss member 134. The panels 252 may align with one or more of the first cut-outs 154, 156, 158, 160 (see FIG. 2), such that the panels

252 may cover the first cut-outs 154, 156, 158, 160. In some examples, the panels 252 may be coupled with the first side truss member 134 using mechanical fasteners (not shown). For example, one or more through-apertures (not shown) in the panels 252 may align with the through-apertures 246 (see FIG. 8) in the mounting blocks 244 for receiving the mechanical fasteners. Further, in the illustrated example of FIG. 9, the panels 252 are coupled to the first side truss member 134 such that the panels 252 contact the outer surface 140 of the first side truss member 134. Alternatively, the panels 252 may be coupled to the first side truss member 134 such that the panels 252 may contact the inner surface 138 (see FIG. 3) of the first side truss member 134.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The frame 106 of the present disclosure includes a simple, truss-based design. Further, the frame 106 has a robust structure that may provide uniform distribution of loads across the frame 106, during operation of the construction machine 100. The frame 106 includes the multiple cut-outs 154, 156, 158, 160, 184, 186, 188, 190, 204, 206, 230 that may reduce a weight of the frame 106 as well as a material used to manufacture the frame 106. Further, the frame 106 includes an integrated structure defining the first and second through-apertures 164, 194 that receive the fastening elements 165, 195, respectively, for coupling the axle assembly 118 with the frame 106. Thus, the frame 106 eliminates conventional floating tag links that couple the axle assembly 118 with the frame 106.

Further, the second lateral truss member 224 includes the mounting plates 232, 234, 236, 238 for coupling the work implement 124 of the construction machine 100 with the frame 106. Thus, the frame 106 may eliminate the conventional implement mounting structures that couple the work implement 124 with the frame 106. Thus, the first side truss member 134, the second side truss member 136, and the second lateral truss member 224 described herein may combine the functionality of the conventional tag links and the implement mounting structures. Hence, the frame 106 may reduce part numbers associated with the construction machine 100. Further, a design of the pair of side truss members 134, 136 may provide improved strength to a portion of the frame 106 that couples with the axle assembly 118. Moreover, the first and second side truss members 134, 136 may provide a cost-effective, easy, and quick technique for mounting the panels 252 with the frame 106.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A frame for a construction machine, the frame comprising:
- a pair of side truss members opposite from each other and extending along a longitudinal axis of the construction machine, wherein each side truss member comprises:
  - a first portion comprising:
    - a top surface and a bottom surface, and
    - at least one first cut-out between the top surface and bottom surface of the first portion; and
  - a second portion comprising:
    - a top surface in a common plane with the top surface of the first portion,
    - a bottom surface extending below the bottom surface of the first portion,
    - at least one second cut-out between the top surface and the bottom surface of the second portion,
    - a curved axle opening, extending through the bottom surface of the second portion, for receiving a portion of an axle assembly of the construction machine, and
    - a first through-aperture adapted to at least partially receive a fastening element;
- a first lateral truss member, extending between the pair of side truss members and proximate to a first end of the frame, defining at least one third cut-out; and
- a second lateral truss member, extending between the pair of side truss members and proximate to a second end of the frame, defining at least one fourth cut-out,
  - wherein the pair of side truss members, the first lateral truss member, and the second lateral truss member together define a hollow space of the frame and have top surfaces that lie in the common plane.

2. The frame of claim 1, further comprising a plurality of mounting blocks coupled to each side truss member, and wherein the plurality of mounting blocks is configured to couple at least one panel of the construction machine with a corresponding side truss member of the pair of side truss members.

3. The frame of claim 2, wherein the at least one panel is a sound suppression panel.

4. The frame of claim 2, wherein each side truss member comprises an inner surface and an outer surface, wherein the at least one first cut-out comprises a cut-out surface extending between the inner surface and the outer surface, wherein at least one of the plurality of mounting blocks extends from, and is coupled to, the cut-out surface to couple the at least one panel to the corresponding side truss member.

5. The frame of claim 1, further comprising a stiffening plate coupled to an inner surface of each side truss member.

6. The frame of claim 1, wherein the second lateral truss member includes one or more mounting plates for coupling a work implement of the construction machine with the frame.

7. The frame of claim 1, wherein the frame includes a rear frame of the construction machine, the rear frame configured to be movably coupled to a front frame of the construction machine, and wherein the first lateral truss member includes a hitch mount for coupling the rear frame with the front frame.

8. The frame of claim 1, wherein the construction machine is a motor grader.

9. A construction machine, comprising:
- a work implement;
- an axle assembly; and
- a frame supporting the work implement and the axle assembly, the frame including:

a pair of side truss members opposite from each other and extending along a longitudinal axis of the construction machine, wherein each side truss member comprises:

a first portion comprising:

a top surface and a bottom surface, and at least one first cut-out between the top surface and bottom surface of the first portion; and a second portion comprising:

a top surface in a common plane with the top surface of the first portion, a bottom surface extending below the bottom surface of the first portion, at least one second cut-out between the top surface and the bottom surface of the second portion, a curved axle opening, extending through the bottom surface of the second portion, for receiving a portion of an axle assembly of the construction machine, and a first through-aperture adapted to at least partially receive a fastening element;

a first lateral truss member, extending between the pair of side truss members and proximate to a first end of the frame, defining at least one third cut-out; and a second lateral truss member, extending between the pair of side truss members and proximate to a second end of the frame, defining at least one fourth cut-out, wherein the pair of side truss members, the first lateral truss member, and the second lateral truss member together define a hollow space of the frame and have top surfaces that lie in the common plane.

10. The construction machine of claim 9, further comprising a plurality of mounting blocks coupled to each side truss member, and wherein the plurality of mounting blocks is configured to couple at least one panel of the construction machine with a corresponding side truss member of the pair of side truss members.

11. The construction machine of claim 10, wherein the at least one panel is a sound suppression panel.

12. The construction machine of claim 10, wherein each side truss member comprises an inner surface and an outer surface, wherein the at least one first cut-out comprises a cut-out surface extending between the inner surface and the outer surface, wherein at least one of the plurality of mounting blocks extends from and is coupled to the cut-out surface.

13. The construction machine of claim 9, further comprising a stiffening plate coupled to an inner surface of each side truss member.

14. The construction machine of claim 9, wherein the second lateral truss member includes one or more mounting plates for coupling the work implement of the construction machine with the frame.

15. The construction machine of claim 9, wherein the frame includes a rear frame of the construction machine, the rear frame being movably coupled to a front frame of the construction machine, and wherein the first lateral truss member includes a hitch mount for coupling the rear frame with the front frame.

16. The construction machine of claim 9, wherein the construction machine is a motor grader.

17. A frame assembly for a construction machine, the frame assembly comprising:

a frame including:

a pair of side truss members opposite from each other and extending along a longitudinal axis of the construction machine, wherein each side truss member comprises:

a first portion comprising:

a top surface and a bottom surface, and at least one first cut-out between the top surface and bottom surface of the first portion; and a second portion comprising:

a top surface in a common plane with the top surface of the first portion, a bottom surface extending below the bottom surface of the first portion, at least one second cut-out between the top surface and the bottom surface of the second portion, a curved axle opening, extending through the bottom surface of the second portion, for receiving a portion of an axle assembly of the construction machine, and a first through-aperture adapted to at least partially receive a fastening element;

a first lateral truss member, extending between the pair of side truss members and proximate to a first end of the frame, defining at least one third cut-out; and a second lateral truss member, extending between the pair of side truss members and proximate to a second end of the frame, defining at least one fourth cut-out, wherein the pair of side truss members, the first lateral truss member, and the second lateral truss member together define a hollow space of the frame and have top surfaces that lie in the common plane; and at least one panel coupled with a side truss member from the pair of side truss members.

18. The frame assembly of claim 17, further comprising a plurality of mounting blocks coupled to each side truss member, wherein the plurality of mounting blocks is configured to couple the at least one panel with the side truss member.

19. The frame assembly of claim 18, wherein each side truss member defines an inner surface and an outer surface, wherein the at least one first cut-out comprises a cut-out surface extending between the inner surface and the outer surface, wherein at least one of the plurality of mounting blocks extends from, and is coupled to, the cut-out surface to couple the at least one panel to the side truss member.

20. The frame assembly of claim 17, wherein the at least one panel is a sound suppression panel.

* * * * *